Dec. 10, 1968   T. W. BURCHAM   3,415,156
CONTROLLED RELEASE DEVICE

Filed April 29, 1966   2 Sheets-Sheet 1

INVENTOR
TERRY W. BURCHAM
James O. Harrell
J H McCoy
ATTORNEYS

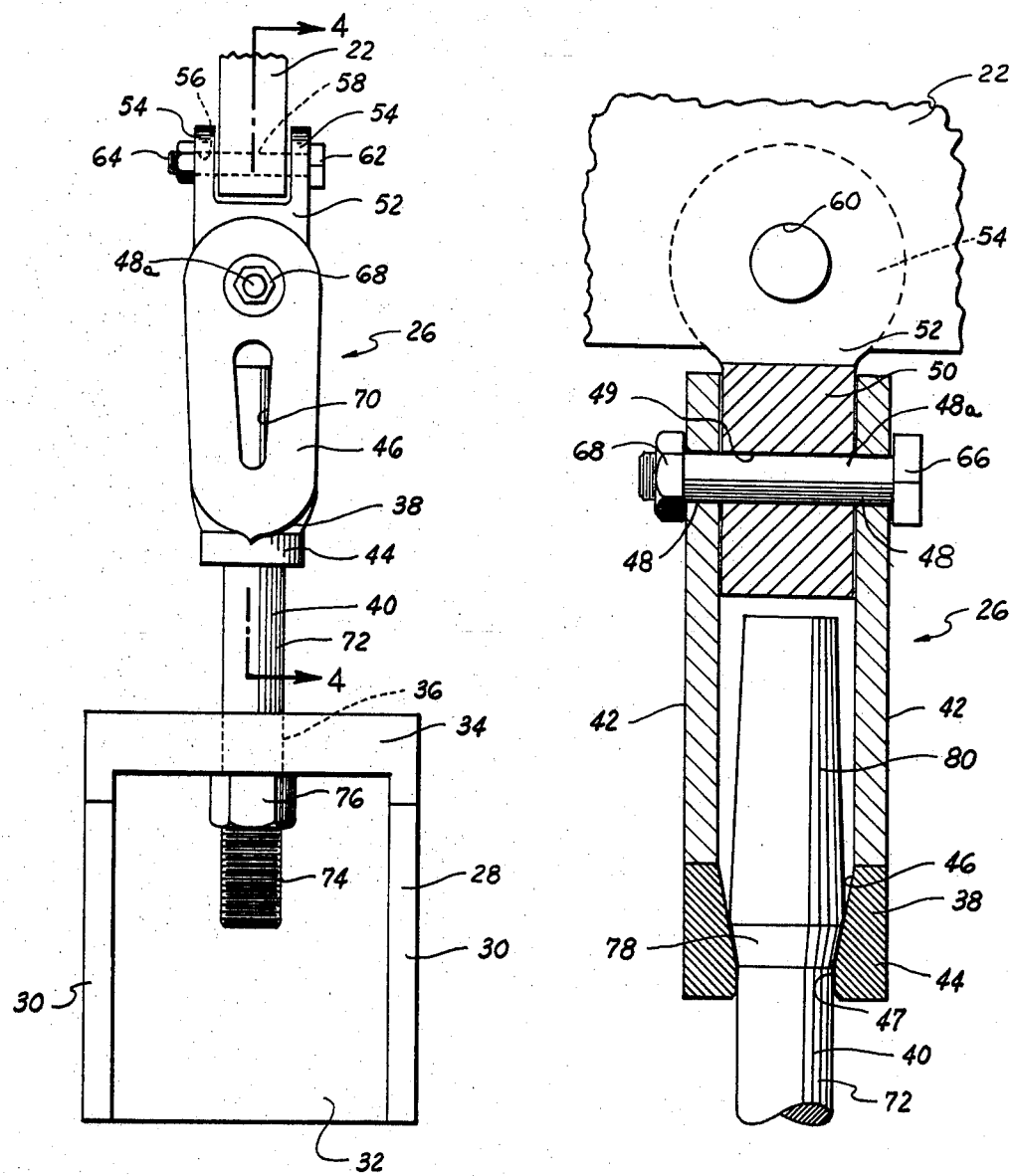

United States Patent Office 3,415,156
Patented Dec. 10, 1968

3,415,156
CONTROLLED RELEASE DEVICE
Terry W. Burcham, Huntsville, Ala., assignor to the United States of America as represented by the Administrator of the National Aeronautics and Space Administration
Filed Apr. 29, 1966, Ser. No. 547,072
2 Claims. (Cl. 89—1.806)

ABSTRACT OF THE DISCLOSURE

A controlled release device for use in launching rockets or missiles that utilizes the expedient of absorbing energy by deforming a ductile elongated pin as it moves through a die.

---

The invention described herein was made by an employee of the United States Government and may be manufactured and used by or for the Government for governmental purposes without the payment of any royalties thereon or therefor.

This invention relates to a controlled motion retarding device, and more particularly to a controlled release device for use in launching rockets or missiles.

Heretofore, in the launching of missiles, especially those of large size, normally before the missile is released from the launch pad, the engines of the missile develops a predetermined amount of thrust. After the engines develop the desired amount of thrust, a hold down arm carried on the launch pad releases the missile. A sudden jar is imparted to the missile when the hold down mechanism is released due to the large thrust build-up. Such an instantaneous release causes dynamic stresses to be imparted to the missile which could damage the missile. Instantaneous release could also damage the very delicate instruments carried by the missile for recording various parameters during the flight operation.

It is desired that there be a gradual controlled release of the missile for the first few inches of travel of the missile from the launch pad. Various apparatus have been analyzed for controlling the release of the missile, but due to the tremendous amount of thrust developed by large missiles they have not proven satisfactory. For example, hydraulic systems have been considered, but due to the size of a system, the plumbing and controls for such a system, and other parameters, they have not been adopted. It is desirable that a reliable, rugged and simple control release device be utilized which is capable of counteracting a predetermined amount of thrust developed by the engines permitting the missile to gradually lift off the launch pad.

In accordance with the present invention, it has been found that the foregoing difficulties encountered in releasing a missile may be overcome by providing a novel controlled release mechanism for missiles. This controlled release device consists of the following basic parts: (1) a die, (2) an elongated deformable element engaging the die for exerting resistance to relative movement therebetween resulting in progressive deformation of the element, (3) the die and the element having connection between the missile and a launching pad for offering support for the missile and (4) the connection being such that as the missile is initially separated from the support during launching, the element is deformed by the die offering progressive controlled release of the vehicle.

The subject invention contemplates a novel expedient of absorbing energy through deforming materials by the relative movement between a deformable element and a die. Previously, metal drawing has been on a relatively small scale wherein energy is exerted for the purpose of deforming the metal into a different shape. The present invention utilizes drawing to produce energy for checking the movement of a vehicle.

Accordingly, it is an object of the present invention to utilize the expedient of drawing metal to control the movement of a vehicle during a predetermined distance of travel.

Another important object of the present invention is to control the release of a missile from a launching pad.

Still another important object of the present invention is to provide a device which minimizes the dynamic stresses imparted to a missile during the initial release of a missile from a launching pad.

A further important object of the present invention is to provide a device which controls the acceleration of a missile during launching.

Still another object of the present invention is to provide a device which is simple and economical which checks the movement of a vehicle.

Another object of the present invention is to provide a device which checks the movement of a vehicle having a spindle that includes a conical section which is forced through a die exerting resistance to relative movement therebetween during deformation of said spindle.

A particular advantage of using the device constructed in accordance with the invention is that the rate of movement of the vehicle to which it is attached is easily controlled by simple variations in the size of the pin or die utilized. Also, the device is simple to manufacture and attach to a vehicle and is reliable and effective in its operation.

Other objects and advantages of this invention will become more apparent from a reading of the following detailed description and appended claims taken in conjunction with the accompanying drawings wherein:

FIGURE 3 is an enlarged side elevational view of the controlled release device constructed in accordance with the present invention; and FIGURE 4 is an enlarged cross-sectional elevational view taken on line 4—4 of FIGURE 3.

Figures 1, 2:
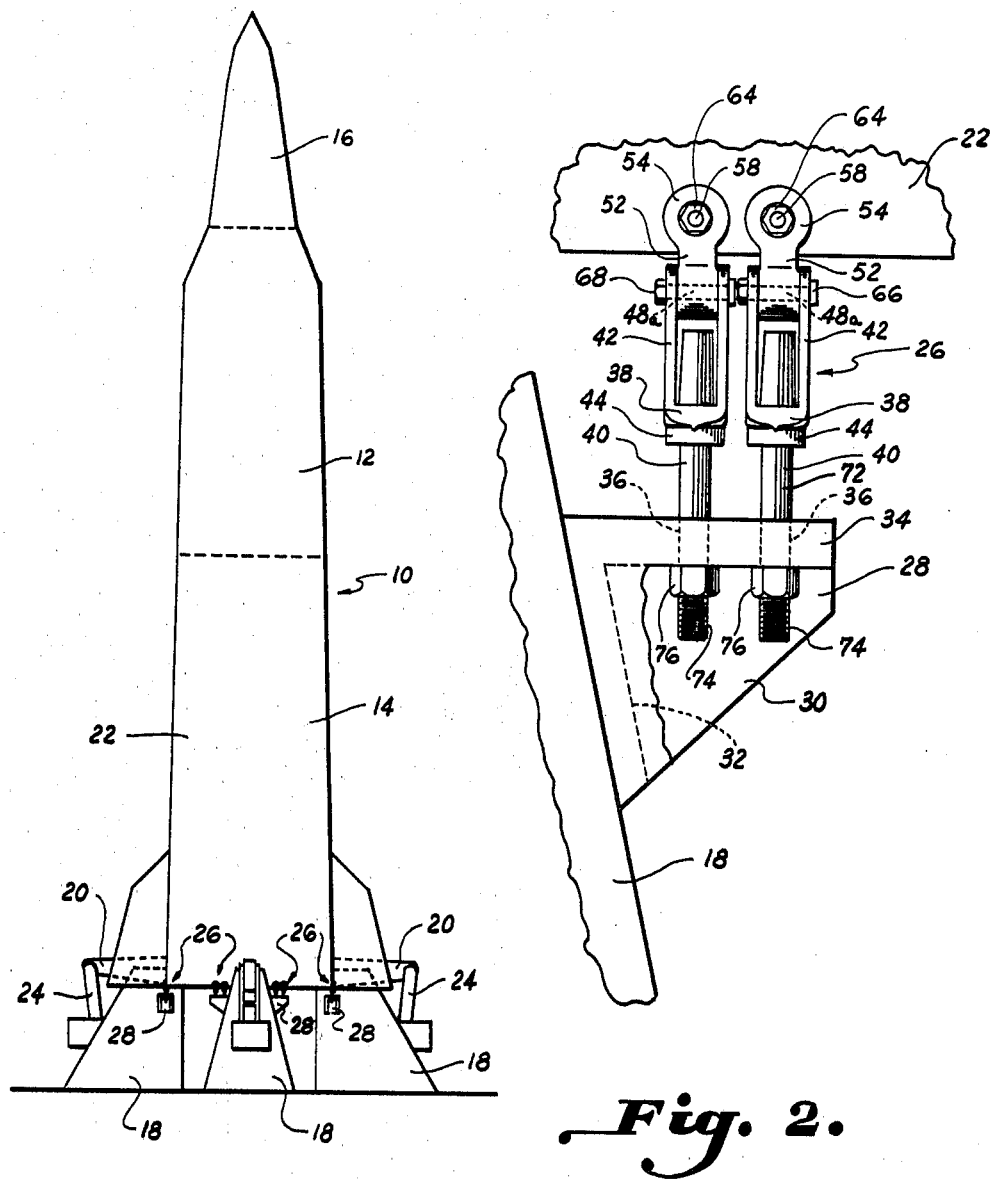
FIGURE 1 is a schematic view of a space vehicle in launching position with a controlled release device constructed in accordance with the present invention illustrated.
FIGURE 2 is an enlarged front elevational view of the controlled release device illustrated in FIGURE 1.

Referring now in more detail to the drawing wherein like reference numerals designate identical or corresponding parts throughout the several views and with special attention to FIGURE 1, reference numeral 10 generally designates a space vehicle, shown as a multistage rocket, erected in a launch position. The multistage rocket 10, which is illustrated schematically, consists of an upper stage 12 and a lower booster stage 14, which separates from the upper stage at a predetermined point in the flight of the rocket. A space vehicle 16 is carried on the upper stage 12 and separates from the upper stage of the rocket when the rocket reaches a second predetermined point in the flight.

The rocket is supported on a plurality of circumferentially spaced launching supports 18. Each of the launching supports 18 has a hold down mechanism including a horizontal hold down arm 20 which engages a bracket (not shown) carried on the skin 22 of the rocket. The horizontal hold down arm 20 is connected to a pivotal vertical support member 24 which is moved outwardly from the rocket to disengage the hold down arm 20 from the bracket prior to launching the rocket. The hold down mechanism does not form part of this invention, but is illustrated for environmental purposes.

A controlled release device, generally designated by reference numeral 26, is connected between the lower perimeter of the skin 22 of the rocket 10 and a bracket 28 carried on the launching support 18. The bracket 28 includes a pair of laterally spaced vertical side plates 30 having their inner edges integral with a back plate 32 which is secured to the launching support 18 by any suitable means, such as bolts and/or welding. A horizontal top plate 34 is integral with the upper edges of the side plates 30 and has spaced apertures 36 therein for receiving the controlled release devices 26.

The controlled release device 26 includes a die 38 and an elongated deformable element, such as a metal pin 40. The die comprises a pair of side plates 42 having their lower ends integral with a circular base 44. The circular base 44 has a conically shaped aperture 46 therein which tapers inwardly from the top of the base 44 and terminates in a cylindrical aperture 47. Each of the side plates 42 has an aperture 48 adjacent its top for receiving a bolt 48a which passes through an aperture 49 in a base portion 50 of a pivot joint 52 carried on the skin 22 of the rocket 10.

The pivot joint 52 includes a pair of laterally spaced vertical flanges 54 each having an aperture 56 therein. When the controlled release device is utilized with a rocket the lower perimeter of the skin 22 of the rocket is connected by a pin 58 intermediate the spaced flanges 54. The pin 58 passes through the apertures 56 in the flanges 54 and an aperture 60 in the skin 22. The pin has a head 62 on one end and a nut 64 is threaded on the other end securing the pivot joint 50 to the rocket. The bolt 48a has a similar head 66 on one end and threaded nut 68 on the other end. The side plates 42 are illustrated as having a vertical aperture 70 in their medial portion.

The pin 40 is preferably constructed of any suitable ductile metal, including but not limited to ductile steel and the like, so that such will be progressively deformed by drawing as the rocket is launched from the launching supports 18. The pin 40 includes a shank portion 72 having threads 74 adjacent its lower end. The shank passes through the aperture 36 in the bracket 28 and is secured thereto by a nut 76. The shank 72 extends upwardly through the cylindrical aperture 47 in the die 38, and is integral with the smaller end of a conical frustum shaped portion 78. The larger end of conical frustum shaped portion 78 terminates in an inwardly tapering elongated portion 80.

The angle provided by the conical shaped aperture 46 in the die 38 is the substantial complement of the angle provided by the conical frustrum shaped portion 78 on the pin 40. The diameter of smaller end of the conical frustum shaped portion 78 of pin 40 and the shank portion 72 is preferably slightly less than the cylindrical portion 47 of the die so as to permit passage of the shank therethrough. The diameter of the larger end of the conical frustum shaped portion 78 is larger than the cylindrical portion 47 and such depends on desired amount of energy that is to be dissipated in pulling the pin 40 through the die. The particular configuration of the pin in the application illustrated is important because the resulting resistance to movement of the vehicle progressively diminishes as the diameter of the pin becomes progressively less. The angle and length of taper of the elongated portions also controls the amount of energy necessary to pull the pin 40 through the die 38. Thus, by varying diameter of the pin 40 and the length and angle of the tapered portion of the pin the length of time for complete release of the rocket can be controlled.

In operation, after the rocket 10 has been erected on the launching supports 18, the hold down arms 20 are moved into position to secure the rocket onto the launching supports 18. The pin 40 of the controlled release device 26 is passed through die 38 until the conical frustum shaped portion 78 of the pin 40 engages the conical shaped aperture 46 of the die. The shank 72 of the pin 40 is passed through the aperture 36 of bracket 28. The die is then secured to the pivot joint 50, which is attached to the skin 22 of the rocket 10, by means of the bolt 48a. The nut 76 is threaded on the shank 72 of the pin 40 securing the pin in the bracket 28. After all of the controlled release devices 26 have been circumferentially spaced around the perimeter of the skin 22 of the rocket 10, the rocket 10 is in condition for launching.

Prior to starting the engines of the rocket 10, during the count down period, readings are taken to insure that the equipment of the rocket is in proper operating condition. If the readings indicate that the rocket's equipment is functioning properly, the engines are started. When the engines develop a predetermined amount of thrust, the hold down arms 20 disengage the rocket 10, and the rocket 10 begins lifting off the launching supports 18. Additional readings are taken between the time of starting of the engines and releasing of the hold down arms to insure that the engines are functioning properly. During the first few inches of lift-off, in the preferred embodiment illustrated, the distance is six inches, the controlled release devices regulates the ascent of the rocket so as to minimize the usual jar which accompanies the launching operation when the hold down arms disengage the rocket 10. As the hold down arm 20 releases the rocket, the pin 40 is deformed as it is drawn through the die 38. Since the die 38 is tapered, the resistance of the pin 40 becomes smaller as the rocket 10 rises, until after approximately six inches of rocket travel, the rocket will be completely free. Additional readings may be taken during the controlled release of the rocket 10.

The length of time for complete release of the rocket can be modified by varying the length of the tapered pin 40 and the amount of energy absorbed can be modified by varying the major diameter of the tapered pin. By previous test and calculation the energy that will be absorbed by a controlled release device can be predicted.

While a preferred embodiment of the invention has been described using specific terms, such description is for illustrative purposes only, and it is to be understood that changes and variations may be made without departing from the spirit or scope of the following claims.

What is claimed is:

1. A controlled release device for use in launching a propelled vehicle from a launching support comprising: a die with an aperture therein having a tapered portion; an elongated ductile deformable element engaging said die through said aperture for exerting resistance to relative movement therebetween wherein said deformable element has a tapered portion which is a substantial complement of said tapered portion of said die, said tapered portion of the die and the deformable element being tapered inwardly opposite the direction of travel of said vehicle; and means for attaching said die to said vehicle and for attaching said deformable element to said launching support whereby when said vehicle is separated from the support during launch, the deformable element is deformed by drawing it through the aperture of said die to provide a progressively controlled release of the vehicle.

2. A controlled release device according to claim 1 wherein said deformable element has a second tapered portion tapered inwardly in the direction of travel of said vehicle for controlling the length of time for complete release of said vehicle.

References Cited

UNITED STATES PATENTS

| | | | |
|---|---|---|---|
| 2,867,153 | 1/1959 | Hirsch | 89—1.806 |
| 3,224,336 | 12/1965 | Eddins | 89—1.806 |
| 2,602,538 | 7/1952 | Bimba et al. | 72—274 |

SAMUEL W. ENGLE, *Primary Examiner.*

U.S. Cl. X.R.

89—1.819